United States Patent [19]

Tysver

[11] Patent Number: 4,693,349
[45] Date of Patent: Sep. 15, 1987

[54] TORQUE LIMITING APPARATUS

[75] Inventor: John Tysver, Rockford, Ill.

[73] Assignee: Sundstrand Corporation, Rockford, Ill.

[21] Appl. No.: 889,369

[22] Filed: Jul. 25, 1986

[51] Int. Cl.$^4$ .......................... F16D 67/02; B60T 7/12
[52] U.S. Cl. ........................................ 192/7; 188/134
[58] Field of Search .............. 192/7, 8 R, 18 R, 56 R, 192/150; 188/134

[56] References Cited

U.S. PATENT DOCUMENTS

| | | | |
|---|---|---|---|
| 2,009,964 | 7/1935 | Mottlau | 192/93 A X |
| 2,045,086 | 6/1936 | Kastner | 192/93 A X |
| 2,649,941 | 8/1953 | Doebeli | 192/93 A X |
| 2,825,434 | 3/1958 | Smitzer | 192/93 A X |
| 3,703,226 | 11/1972 | Strehler et al. | 192/93 A X |

Primary Examiner—George H. Krizmanich
Attorney, Agent, or Firm—Wood, Dalton, Phillips, Mason & Rowe

[57] ABSTRACT

An apparatus for limiting the amount of torque from a drive source applied to a torque responsive element in which a pair of rotatable cam plates have opposing faces formed with radially extending grooves. A plurality of angularly spaced balls are provided for respectively engaging within the opposing ramp grooves. A retainer plate is sandwiched between the opposing cam plates, with angularly spaced holes for freely receiving and radially retaining the balls. The retainer plate has periheral walls for surrounding, journalling and piloting the cam plates.

3 Claims, 4 Drawing Figures

TORQUE LIMITING APPARATUS

FIELD OF THE INVENTION

This invention relates to a torque limiting apparatus and, particularly, to a combination no-back brake and torque limiter assembly.

BACKGROUND OF THE INVENTION

It often is necessary to use torque limiting devices in association with other machinery or equipment to prohibit the transfer of torques above a certain preset value so that damage to associated machinery does not occur. Such devices are widely used in aircraft applications, such as actuators for moving the flaps of aircraft wings, for manually moving rotary launching devices and the like. For instance, in rotary launching devices, the devices normally are operated by power driven mechanisms. However, it may be desirable on the flight line to manually drive the associated mechanisms for limited purposes, i.e. by hand. It is desirable to prevent the application of excessive forces which might cause damage to the associated mechanisms. Therefore, when the driving torque applied exceeds a specific overload, it is mandatory in many instances that the drive mechanism immediately be locked out to prevent damage to the actuator or the associated mechanism itself.

Specifically, there are a variety of drive systems such as described above wherein it is desirable to brake an output shaft against rotation until power is supplied to an input shaft operatively connected to the output shaft. It is known to associate a brake with such structure which will hold the output shaft against rotation and which will automatically release upon sensing input torque. It also is known to have mechanism including a brake which will limit the amount of torque transmitted from an input shaft to an output shaft. For some time, prior mechanisms performed either the no-back brake operation or the torque limiting operation, but the prior mechanisms did not accomplish both by use of the same brake. In U.S. Pat. No. 4,176,733 to Twickler, dated Dec. 4, 1979 and assigned to the assignee of this invention, an assembly is disclosed utilizing a single brake which functions to provide no-back brake operation as well as torque limiting operation, with the brake being progressively released intermediate the aforesaid two conditions to permit non-braked rotation of the output shaft. This invention is directed to an assembly similar to that shown in the Twickler patent, but with certain improvements.

For instance, many such torque limiting devices are used in what is commonly termed a "broken back" system. In other words, continuous drive shafts normally are journalled and piloted between two bearings spaced axially of the shaft. However, in many applications where an input shaft and an output shaft meet at an actuator, the drive shaft means is not continuous and is "broken" or jointed at the actuator itself intermediate or between the two axially spaced bearing means. When torque limiting devices, particularly ramp-ball devices, are used in the actuator in a "broken back" system, piloting of the input and output is desirable but rarely accomplished except for the interengagement between the balls and the ramps, the ramps conventionally taking the form of pockets in opposing cam plates. The pockets themselves perform a piloting function, but manufacturing such ramp pockets within acceptable tolerances is quite expensive. With the present invention, radially extending ramp grooves are used in the torque limiting device, eliminating the expensive ramp pockets, and simple, novel piloting means are provided between the input and output.

SUMMARY OF THE INVENTION

An object, therefore, of the invention is to provide a new and improved no-back brake and torque limiter assembly which has an inexpensive ramp and ball torque limiting design, with simple and efficient means built into the structural design for piloting the input and output.

In the exemplary embodiment of the invention, the assembly or apparatus includes opposed, relatively rotatable input and output cam plates having ramp means in the form of radial grooves in opposing faces of the cam plates. The cam plates are biased toward each other by appropriate spring means. A plurality of angularly spaced balls are provided for engaging the opposing radial grooves in the input and output cam plates. A retainer plate is sandwiched between the opposing cam plates for retaining the balls in engagement with the ramp grooves. Generally, means are provided, operatively associated between the retainer plate and the cam plates, for axially piloting the cam plates to maintain alignment therebetween.

More particularly, the ball retainer plate and the cam plates are generally disc-shaped. The retainer plate includes axially projecting, integral wall means of cylindrical configuration for surrounding and journalling the input and output cam discs.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
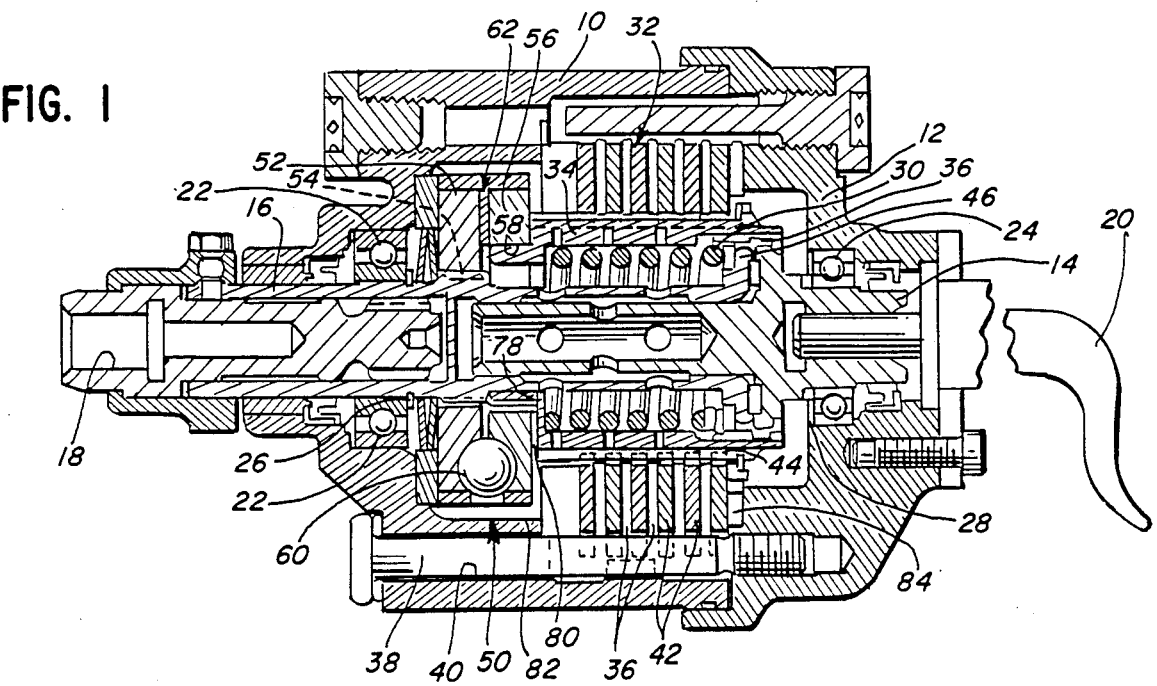
FIG. 1 is a central, generally axial section through the combination no-back brake and torque limiter assembly of this invention.

Referring to the drawings in greater detail, and first to FIG. 1, an assembly which includes the novel torque limiting apparatus of this invention includes a casing 10 with an end closure member 12 which houses an elongate output shaft 14 and an input shaft 16. Input shaft 16 has a socket 18 for receiving a tool, such as a wrench, for manual rotation. Output shaft 14 is coupled to a flexible shaft 20 which leads to a gear box for driving an associated mechanism by a main motor shaft. Input shaft 16 is rotatably mounted by bearing means 22, and output shaft 14 is rotatably mounted by bearing means 24. Bearing means 22 is fixed to housing 10 by a retainer clip means 26, and bearing means 24 is fixed to end closure member 12 by a retainer clip means 28. This arrangement commonly is called a "broken back" system because the input shaft and output shaft, in essence, are jointed between the bearings.

A coil spring 30 surrounds the inner end of input shaft 16 and is operatively associated with a brake, generally designated 32. A brake hub 34 surrounds coil spring 32, and output shaft 14 is splined to brake hub 34, as at 36, for fixed rotational association therewith.

Brake 32 has a series of brake elements in the form of annular plates associated with casing 10 and output shaft 14. More particularly, a first series of plates 36 have their outer peripheries keyed to the interior of casing 10. This is accomplished by at least one bolt 38 extending through a bore 40 in casing 10 and through brake plates 36. A second series of brake plates 42 are interleaved with the first series and have their inner peripheries keyed or splined to the exterior of brake hub 34, as at 44. Preferably, the brake plates have pressure pads provided on the adjacent faces thereof.

Coil spring 30 reacts at one end against the base of brake hub 34 and at the other end against an annular flange 46 projecting radially outwardly from the inner distal end of input shaft 16. Therefore, the spring biases the brake plates together through the brake hub. One end of the series of brake plates abuts casing 10, as at 48.

A torque limiting apparatus is provided and generally designated 50 for limiting the amount of torque from input shaft 16 to a torque responsive element, i.e. output shaft 14, flexible shaft 20 and the associated mechanism.

Figure 2:
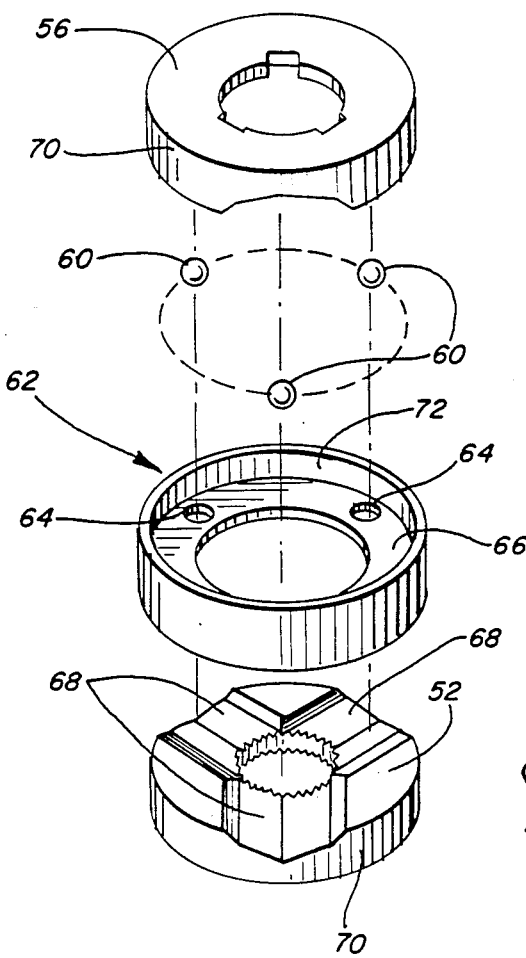
FIG. 2 is a perspective view of the opposed cam plates and ball retainer plate of the invention.

More particularly, and referring to FIG. 2 in conjunction with FIG. 1, an input cam plate 52 is keyed or splined to input shaft 16, as at 54 (FIG. 1). An output cam plate 56 is keyed or splined to brake hub 34, as at 58. A plurality of angularly spaced balls 60 are sandwiched between and engage within ramp means (described below) formed in opposing faces of the cam plates. A retainer and piloting plate, generally designated 62, is disposed between cam plates 52,56 for radially retaining the balls in engagement and in proper position with respect to the ramp means on the cam plates.

Referring more particularly to FIG. 2, three balls 60 are angularly spaced and retained by apertures 64 in a disc-shaped plate portion 66 or retainer plate 62. The balls are sandwiched between and engage within ramps 68 formed in the opposing faces of cam plates 52,56.

It can be seen that cam plates 52,56 are discshaped and provided with circular outer peripheries 70. Retainer plate 62 is provided with cylindrically shaped surrounding walls 72 projecting axially from opposite sides of disc-shaped plate portion 66. Cylindrical walls 72 and plate portion 66 define cup-shaped receptacle means for receiving, journalling and piloting cam plates 52 and 56 which, in essence, comprise the input and output, respectively, of the torque limiting apparatus. Therefore, it can be seen that the one-piece construction of retainer plate 62 not only angularly spaces and radially retains the position of balls 60, but the cylindrical walls of the retainer plate unitarily journals and pilots the input and output cam plates of the torque limiting apparatus. The simplicity and ease of construction are readily apparent. The piloting of cam plates 52,56 thereby enables ramps 68 to be formed as radially extending grooves as shown in FIG. 2, versus the provision of expensive ramp pockets which is prevalent in the prior art. Although ramp pockets provide limited piloting for the input and output of a torque limiting apparatus, it is very expensive to form the pockets with acceptable tolerances.

Figure 3:
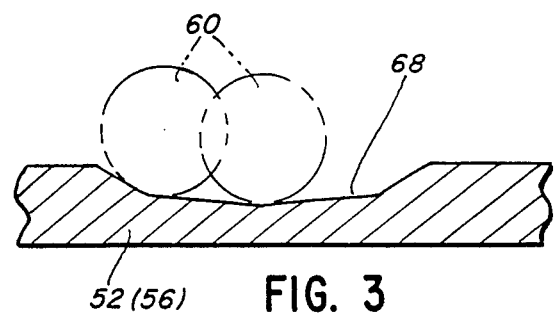
FIG. 3 is a fragmented section, on an enlarged scale crosswise through a radial ramp in one of the cam plates.
Figure 4:
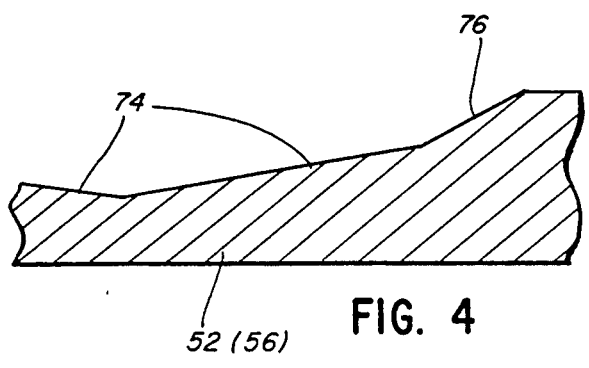
FIG. 4 is a fragmented section, on a further enlarged scale, through one-half of a ramp as shown in FIG. 3.

FIGS. 3 and 4 show in greater detail the configuration of ramps 68 in cam plates 52,56. The ramps are bi-directional and only one side of a ramp is shown in FIG. 4. A shallow-angle ramp portion 74 is provided, leading away from the base of each ramp and joining a deeper angled ramp portion 76 along the outer edges of the ramp. The shallow ramp is the no-back ramp as described hereinafter.

In operation, ramp portions 74 and 76 are designed at angles, in relation to the load of spring 30 and the given radius for locating balls 60, such that it requires approximately ten inch-pounds to drive the balls up ramp portion 74 and approximately fifty inch-pounds to drive up ramp portion 76. When it is desirable to apply a manual torque to input shaft 16 (e.g. a wrench in socket 18), input shaft 16 is rotated against the ten inch-pound load to drive the balls up ramp portion 74. Since cam plate 52 is in fixed abutment, as at 78 (FIG. 1), cam plate 56 is moved to the right as viewed in FIG. 1 into engagement with brake hub 34, as at 80. Continued movement moves the brake hub against the biasing of spring 30 to take the pressure off of interleaved brake plates 36,42. In essence, the brake plates are spread apart. When the balls reach the deeper or more inclined ramp portion 76 (FIG. 4), ramp plate 56 will engage one end of the interleaved brake plates, as at 82, which again clamps the brake plates against end abutment 48 (FIG. 1) at the opposite end of the interleaved plates. This causes the brake plates again to lock up. At this point, if a back torque reacts from the associated mechanism through flexible cable 20 and output shaft 14, the ramp plates oppose the back torque to the higher force rate of fifty inch-pounds afforded by ramp portion 76. In addition, it can be seen that no matter how much torque is applied to input shaft 16 by any form of force application, the applied force can never exceed the fifty inch pound limit of ramp portion 76.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. An apparatus for limiting the amount of torque from a drive source supplied to a torque responsive element, comprising:

a disc-shaped rotatable input cam plate having ramp means;

a disc-shaped rotatable output cam plate having ramp means;

means for biasing the cam plates toward each other;

a plurality of angularly spaced balls for engaging the ramp means of the input and output cam plates; and a disc-shaped retainer plate between the cam plates with angularly spaced holes for freely receiving and radially retaining the balls in engagement with the ramp means, the retainer plate including generally cylindrically shaped, axially projecting wall means for surrounding and axially piloting the cam plates.

2. The apparatus of claim 1 wherein said ramp means comprise radial grooves in opposing faces of the cam plates.

3. A combination no-back brake and torque limiter assembly comprising a casing, a rotatable input shaft, a rotatable output shaft, a pair of opposing ramp discs rotatably associated one to each of the input and output shafts, brake means associated with the output shaft including at least spaced-apart brake elements carried by the casing and interleaved brake elements therebetween and rotatable with the input shaft, spring means urging the brake elements toward no-back braking pressure engagement, ramp means and interacting balls between said opposing ramp discs to increase the space therebetween for acting on the spring means to reduce the pressure engagement of the brake means and then exerting force on the brake means in response to further increasing the space between the ramp discs to obtain torque limiting brake pressure engagement as the torque applied to the input shaft approaches a maximum value, the ramp discs having radially extending ramp grooves in opposing faces for engaging the balls, a discshaped retainer plate between the ramp discs with angularly spaced holes for freely receiving and radially retaining the balls, said retainer plate including cylindrically shaped, axially projecting wall means for surrounding and axially piloting the ramp discs.

* * * * *